United States Patent [19]

Rush

[11] Patent Number: 5,354,477

[45] Date of Patent: Oct. 11, 1994

[54] LOW MOLECULAR WEIGHT AMINES AND AMINE QUATERNARIES FOR THE REMOVAL OF SOLUBLE ORGANICS IN OIL FIELD PRODUCED WATER

[75] Inventor: Thomas E. Rush, Richmond, Tex.

[73] Assignee: Champion Technologies, Houston, Tex.

[21] Appl. No.: 864,943

[22] Filed: Apr. 7, 1992

[51] Int. Cl.$^5$ ................................................. C02F 1/54
[52] U.S. Cl. ....................................... 210/708; 210/725
[58] Field of Search ............... 210/634, 639, 696, 708, 210/729, 725

[56] References Cited

U.S. PATENT DOCUMENTS

| | | | |
|---|---|---|---|
| 3,687,845 | 8/1972 | Treat et al. | 210/54 |
| 4,035,289 | 7/1977 | Guillerme et al. | 210/11 |
| 4,401,570 | 8/1983 | Blytas et al. | 210/639 |
| 4,600,518 | 7/1986 | Ries et al. | 252/34 |
| 4,729,832 | 3/1988 | Leonard et al. | 210/634 |
| 4,818,410 | 4/1989 | Bellos et al. | 210/708 |
| 4,839,054 | 6/1989 | Ruebush et al. | 210/639 |
| 5,013,451 | 5/1991 | Thompson et al. | 210/708 |

*Primary Examiner*—Ivars Cintins
*Attorney, Agent, or Firm*—Gunn & Kuffner

[57] ABSTRACT

A method is set forth for the treatment of mixed oil and water flowing from a producing oil well. Certain salts may be formed by the mixture some of which will be soluble organic salts. The present process sets forth a method of treating the produced stream with low molecular weight amines and preferably amine quaternaries with strong acids so that the oil based salts are removed from the water phase and left with the oil for segregation, thereby permitting disposal of the produced water without creating a sheen on the produced water. Subsequent waste water treatment is avoided to remove traces of oil on the produced but separated water.

11 Claims, No Drawings

LOW MOLECULAR WEIGHT AMINES AND AMINE QUATERNARIES FOR THE REMOVAL OF SOLUBLE ORGANICS IN OIL FIELD PRODUCED WATER

BACKGROUND OF THE DISCLOSURE

The present disclosure is directed to a method of separating production from a producing well, and in particular, a well which produces oil and water from a subterranean producing formation. In the production of oil wells, it is not uncommon to obtain a mix of flowing products. One type of product obtained from the flowing well may include gas which separates as the production fluids are received at the surface. Another product that may be carried along in the production stream may be particles of the formation i.e. sand particles. The present disclosure is not concerned with either of these although they may be present. Generally, both natural gas and sand are separated in ways which are believed to be well known when the production stream is received at the surface. It is more common to encounter the production of oil and water which are mixed together. There is a generalization that oil and water will not mix, rather, they form separate phases. Even when they are produced in the form of emulsified droplets, there is a tendency for them to separate. That is not always however the case. In some instances, the water in the formation may be heavily laden with various organic salts, some of which are significantly water soluble. A "salt" is any compound formed when the hydrogen ($H^+$) of an acid is replaced by a metal (such as $Na^+$, $Mg^+$, $Cu^+$, etc.) or its equivalent ($NH_4^+$, etc). The petroleum produced by the well may contain carboxylic acid and other acids. When the hydrogen atom is replaced with a metal atom, it is no longer an "acid", but rather a "salt". This is a problem in separation, and it is equally a problem in discarding the water produced from the well, typically salty water. These organic salts include any metal salt of a low molecular weight organic acid, and a wide range of these salts can be readily detected in the production. One factor which enters into this is the range of variation in the oil/water ratio. If the amount of water is quite small i.e. one part per ten parts, or even one part per one hundred parts, then the said production stream is quite valuable. However, there are many wells which produce perhaps one barrel of oil for ten barrels of water, and other wells have been completed which have an even more undesirable ratio of oil to water. In any context, the separation of the oil and water poses a problem to the extent that there are water soluble organics mixed in the production stream. This is exemplified by several examples given herein, but a generalized statement of the problem relates primarily to typical metal salts of low molecular weight which form low molecular weight organic acids. Typically, the acid has a lipophilic tail which involves $C_4$ and larger molecules typically up to about $C_{18}$. The lipophilic tail can be straight chained, branched or cyclic. As a generalization, the formula is represented as R—COOH hence the acid form. It is not uncommon for a substantial mix ranging all the way from $C_4$ up to about $C_{18}$ to be in the stream of production. The metals that are involved can vary widely and typically include such things as Potassium, Sodium, Calcium and other salt forming metals so common to brine produced from oil and gas wells.

Accordingly, the present disclosure is directed to a solution for this problem which deviates from the idealized form of phase separated oil and water in a production stream. Departing from the idealized form, there are the water soluble organic compounds which, if not otherwise separated, will stay in the separated water. There are limits to this. Salt water disposal is always a problem, and it is particularly undesirable to dispose of salt water which includes an excessive amount of organics in the salt water. Pollution standards that presently prevail in the Gulf of Mexico forbid the discharge from a production platform of recovered salt water where the organics measure in excess of 48 ppm; occasional increases to 72 ppm are permitted for a limited interval, but the normal discharge must be 48 ppm or less. The present disclosure sets forth a method for accomplishing this.

This disclosure represents an advance over the procedure set forth in U.S. Pat. Re No. 29,908. That discloses an oil waste recovery procedure involving demulsification with flocculation. It is not concerned with removing water soluble organics from the production stream. U.S. Pat. No. 3,687,845 is directed to the removal of oil from an oil/water emulsion by the addition of a water soluble anionic polymer of relatively high molecular weight. Even so, water soluble organics are not impacted by this treatment process. A micro organism approach is set forth in U.S. Pat. No. 4,035,289. U.S. Pat. No. 4,401,570 sets forth a method for removing organic esters from a waste water stream using an acid approach which still does not provide for sufficient oil removal from the produced water stream. U.S. Pat. Nos. 4,818,410 and also 4,839,054 set forth the use of strong acids. These procedures lead to corrosion difficulties, and have an inefficient response.

The present disclosure is primarily a method which comprises the intimate mixing or commingling of an additive to the production fluids prior to separation into separate oil and water streams. The addition utilizes a strong acid, selected acids include HCl, $H_2SO_4$, $H_3PO_4$, $H_3PO_3$, and citric acid, or mixtures of the foregoing acids. This will be denoted as a strong acid which lowers the pH of the produced water to 6.0 or below, the preferred range being about 2.0 to about 6.0. Of the group of acids mentioned, phosphorous acid appears to be the preferred of the several strong acids mentioned. The acid is mixed with any of a number of low molecular weight amines or amine quaternaries. It has been found that something on the order of about 5% to about 30% of the amine or amine quaternaries with the acid provides a satisfactory mixture of the acid and amine or amine quaternaries.

DETAILED DESCRIPTION OF THE PREFERRED EMBODIMENT

The present disclosure is directed to a method of treating a producing well. For example, it can be applied to any producing well which is producing oil and water mixed in the production stream which also carries with it water soluble organics. The ratio of oil to water can vary as widely as appropriate for production. It can be used with those wells which produce substantially more water than oil, and it can also be used with wells which produce only a trace. Moreover, the method of the present procedure is implemented on the production stream before separation has occurred into major constituent cuts of oil separated from water. Indeed, the method of this disclosure contemplates the injection of chemicals as will be described at a point so near the well head that the production stream has not yet been delivered for separation, e.g., by introducing the production stream into a free water knockout container or a separator such as gun barrel tank. There may be related separation steps such as the removal of natural gas and sand, but they do not enter into this procedure and produced sand and gas will be ignored. The production is at ambient temperature which typically does not exceed the boiling temperature of water, and typically is in the range of perhaps 175° F. or less. Again, this can vary markedly. With regard to the pH of the produced stream, it can be any level, typically in the range of about 6.0 to about 8.5, but even should it be higher (above pH 9.0) as in a caustic flood, that also can be dealt with as will be described. The production stream is delivered through some kind of flow line, and the injected ingredients of this disclosure are intimately mixed with that flow so that there is full contact. That is, this procedure contemplates this injection in a fashion which mixes with the flowing production fluids so that intimate contact with the flowing fluids is obtained.

The present procedure contemplates first measuring the total flow of volume and the pH of that flow volume so that the appropriate amount of acid can be added. It is desirable to lower the pH of the water in the production fluids from the value at production to a value which is 6.0 or less. Preferably, sufficient acid is added so that the pH is 6.0 or preferably even 5.5 or so. It can be lowered further, but this requires a greater volume of acid and is a more costly approach. Therefore the pH is adjusted to some value which is in the region at 6.0 or just below so that a sufficient change in the acidity of the produced water has been accomplished to cooperate with the removal of the water soluble organics in the production stream. The acid that is injected can be any of several strong acids, the preferred strong acids being $HC_1$, $H_2SO_4$, $H_3PO_4$, $H_3PO_3$, and citric acid. In addition, mixtures of these acids can be used. The preferred of the several acids appear to be phosphorus acid, at least it is preferred in the procedures in examples which are given below. There may be other water soluble organics in the different oil fields which might readily yield removal to other combinations of acids, especially the strong acids which are mentioned above and which are added in the amounts to accomplish the pH change described. The acid that is added to the flowing production fluids is mixed with a low molecular weight amine or amine quaternary. Various amines and amine quaternaries are listed below and include:

| NAME | IUPAC NAME | TSCA # |
|---|---|---|
| 1. TER 1-92-10 | 2-Hydroxy-N,N,N-trimethyl-ethanaminium chloride | [67-48-1] |
| 2. TER 1-92-11 | 2-Hydroxy-N,N,N-trimethyl-ethanaminium acetate | Q |
| 3. TER 1-92-13 | 2-Hydroxy-N,N,N-trimethyl-ethanamium salt with 2-Hydroxy-1,2,3-propane tricarboxylic acid (3:1) | [546-63-4] |
| 4. TER 1-92-12 | 2-Hydroxy-N,N,N-trimethyl-ethanaminium phosphate (3:1) | Q |
| 5. TER 1-92-8 | N,N,N-Trimethyl-methanaminium chloride | [75-57-0] |
| 6. TER 1-92-9 | N,N,N-Trimethyl-oxirane-methanaminium chloride homopolymer | [51838-31-4]XU |
| 7. Triethanol Amine | 2,2'2''-Nitrilotris-ethanol | [102-71-6] |

-continued

| NAME | IUPAC NAME | TSCA # |
|---|---|---|
| 8. TER 1-8-1 | N-Methyl-methanamine polymer with (chloromethyl) oxirane | [25988-97-0]XU |
| 9. TER 1-8-2 | N-methyl-methanamine polymer with (chloromethyl) oxirane | [25988-97-0]XU |
| 10. TER 1-8-3 | N-Methyl-methanamine polymer with (chloromethyl) oxirane | [25988-97-0]XU |
| 11. TER 1-8-5 | 1,2-Ethanediamine, polymer with (chloromethyl)oxirane and N-Methyl-methanamine | [42751-79-1]XU |
| 12. TER 1-10-1 | N,N-Dimethyl-N-2-propenyl-2-propen-1-aminium chloride homopolymer | [26062-79-3]XU |
| 13. Aminoethyl-piperazine | 1-Piperazineethanamine | [140-31-8] |
| 14. Triethylene-tetramine | N,N'-Bis(2-aminoethyl)-1,2-ethanediamine | [112-24-3] |
| 15. Aminoethyl-ethanolamine | 2-[(2-Aminoethyl)amino]-ethanol | [111-41-1] |
| 16. Hydroxyethyl piperazine | 1-Piperazineethanol | [103-76-4] |
| 17. TER 1-92-4 | 2,2'-Oxybis(N,N,N-trimethyl)-ethanaminium dichloride | [6343-88-0] |
| 18. TER 1-92-1 | 2-Hydroxy-N,N,N,N'N'N'-hexamethyl-1,3-propanediaminium dichloride | Q |
| 19. TER 1-92-3 | 2,4,6-Tris(N,N,N-trimethyl-methanaminium)phenol trichloride | Q |
| 20. TER 1-92-2 | N,N-Dimethyl-poly-ethyleneaminium chloride | Q |

By amount, something in the vicinity of about 5% to about 30% of the amine or amine quaternary (by weight) with the strong acid (the remaining component by weight, or 70% to 95%) provides a marked reduction in the water soluble organics in the production fluids. Several examples wi 11 be given below, and the preferred versions of the present treatment will then be mentioned.

EXAMPLE 1

This involves the treatment of the production fluids obtained from an offshore lease in the Gulf of Mexico. The production fluids included water which had a pH of about 7.10 and which contained up to about 140 ppm of water soluble organics. Production stream was approximately 50% water and 50% oil. The temperature was elevated, to perhaps 140° to about 150°. Laboratory analysis of the water soluble organics showed that they were primarily carboxylic acids. A typical breakdown of the typical constituents in the production stream may reveal the $C_{12}$ and higher molecules to be as much as 50% of the produced oil. On the other hand, some wells produce mostly light ends, say one half being $C_{10}$ or lighter. The relative mixture of salts was quite high, resulting in substantial buffering of the production fluids so that it took approximately 2000 ppm of acid to reduce the separated water discharged from this offshore platform to less than about 48 ppm or less water soluble organics. While that was the necessary requirement using acid only, blends of the acid and the amine or amine quaternary reduce the amount of chemical necessary to obtain this reduction to only about 1000 ppm, or a reduction of about 50%. Restated, the amount of acid was reduced by over 50% by the modest addition of about 5% to about 30% by weight of either amine or amine quaternary.

EXAMPLE 2

The production fluid from a different offshore lease in the Gulf of Mexico was tested. For one particular specific measurement, an acid treatment required 40 gallons of acid to accomplish the reduction of soluble organics to the acceptable level of 48 ppm or less. With a blend of acid and amine or amine quaternary required only about 3 to 8 gallons to accomplish the same measure of water soluble organic reduction to the requisite level of 48 ppm or less.

EXAMPLE 3

Going to another field in the Gulf of Mexico and utilizing production fluids from a production platform in that field, a batch of production of specified size requires about 10 gallons of strong acid to reduce the water soluble organics in the batch to the acceptable level of 48 ppm or less for the separated water and the water soluble organics in it. Utilizing the same production fluids, and treating this same size batch, the mixture of between 5 and 30% of amines or amine quaternaries with the acids resulted in a reduced requirement of about 5, but not more than 6 gallons of blended mixture to accomplish the same reduction in the water soluble organic constituents in the waste water recovered from production stream.

Going now to the list of amines or amine quaternaries given above, it is thought that the Trimethyl Methanaminium Chloride is the preferred of the list insofar as treatment of the fluids in the Gulf of Mexico. Separately, it has been noted that the third entry in the list (hereinafter choline citrate for short) is probably the most effective, but is somewhat more expensive treatment fluid. Probably, these will operate successfully when they are the sole amine or amine quaternary, but there is no reason to believe that they may not be blended so that a mix of those on the list shown above can be used.

As a generalization, the strong acid can be injected blended with the amine or amine quaternary. For convenience of transportation, mixing typically can occur at a stocking warehouse for shipment to an offshore production platform where the acid is injected with the amine. This takes into account the practicalities of acid manufacture, shipment and delivery. Moreover, the injection procedure contemplates an injection into a production fluid stream which maintains a reasonably well measured and established pH as well as production flow rate, ratio of water to oil, and other factors which might vary somewhat the rate at which the strong acid and the amine or amine quaternaries are injected. Again, the injection is carried out on a continuous basis with production so that the oil and water are separated in the ordinary fashion, but the waste water which is recovered after separation has such a reduced amount of water soluble organics in it that the standard water clarification programs have no trouble in meeting the overboard discharge limit of 48 ppm or less.

CORROSION INHIBITORS

Depending on the metal in the flow lines, and also dependent on operating temperatures, acid concentration and other scale factors, it may be appropriate to add corrosion inhibitors. The preferred corrosion inhibitors are the products listed below:

| | |
|---|---|
| 1-(phenylmethyl)Quinolinium chlorides | [15619-48-4] |
| Ethyl methyl derivatives of 1-(Phenylmethyl)-pyridinium chloride | [68909-18-1] |

These are added in a suitable quantity which is typically in the range of any amount that is effective to retard corrosion up to perhaps 3 or 4% in an optimum mixture or higher to perhaps about 9% at the maximum.

As a generalization, the quaternary amines of this disclosure have the following ranking in terms of effectiveness:

| | |
|---|---|
| 1. | TER 1-92-1 |
| 2. | TER 1-92-13 |
| 3. | TER 1-92-8 |
| 4. | TER 1-92-4 |
| 5. | TER 1-92-2 |
| 6. | TER 1-92-10 |
| 7. | TER 1-92-11 |
| 8. | TER 1-8-2 |
| 9. | TER 1-8-3 |
| 10. | TER 1-92-9 |
| 11. | TER 1-8-1 |

In all the foregoing, the preferred mixture is any amount which is deemed effective up to about 30% maximum by weight of the mixture wherein the remainder is acid. As previously noted, five preferred acids have been listed, and they are used either singly or as mixtures. As a generalization, it is not worth the added cost to obtain total purification of the acid so that mixtures may be permitted. With regard to acid strength, it is not necessary to utilize the strongest acid which can be made; rather, it is more desirable to utilize a more economical acid or acid mixture. In this instance, typical acids range in the area of perhaps 20 to 40% acid.

The preferred acid mixture is probably phosphorous acid while phosphoric acid is also highly desirable. The other three mentioned acids are equally useful and provide a successful treatment when mixed with the amines or quaternary amines of the present disclosure.

While the foregoing is directed to specific embodiments and sets forth various aspects of these embodiments, the scope is determined by the claims which follow:

I claim:

1. A method of removing water soluble organics from a flowing mixture of oil and water produced from a flowing oil well which method comprises the steps of:
    (a) adding a blend of a strong acid with an amine to the flowing commingled oil and water from the producing well;
    (b) adjusting the pH of the water in the flowing oil and water mixture to a pH of about 6.0 or less;
    (c) intimately mixing the added acid and amine in the flowing water; and
    (d) separating the oil and water while holding water soluble organics in the oil phase on separation.

2. The method of claim 1 wherein the strong acid is selected from the group consisting of hydrochloric, sulfuric, phosphoric, phosphorus, citric acid, and mixtures thereof.

3. The method of claim 1 wherein the amine is a quaternary amine.

4. The method of claim 3 wherein the quaternary amine is selected from the group consisting of:
    2-Hydroxy-N,N,N-trimethyl-ethanaminium chloride;

2-Hydroxy-N,N,N-trimethyl-ethanaminium acetate;
2-Hydroxy-N,N,N-trimethyl-ethanaminium salt with 2-Hydroxy-1,2,3-propane tricarboxylic acid (3:1);
N,N,N-Trimethyl-methanaminium chloride;
N-Methyl-methanaminium polymer with (chloromethyl)oxirane;
2,2'-oxybis(N,N,N-trimethyl)ethanaminium dichloride;
N,N,N-Trimethyl-oxirane-methanaminium chloride homopolymer;
2 Hydroxy-N,N,N,N',N',N'-hexamethyl-1,3-propanediaminium dichloride;
N,N-Dimethyl-polyethyleneaminium chloride; and mixtures thereof.

5. The method of claim 4 wherein the pH is in the range of about 3.0 to about 6.0.

6. The method of claim 5 wherein the quaternary amine is mixed with and acid by weight in percentage up to about 30% of the mixture.

7. The method of claim 6 including a corrosion inhibitor in an effective amount added to the quaternary amine and acid mixture.

8. The method of claim 3 wherein the strong acid is selected from the group consisting of hydrochloric, sulfuric, phosphoric, phosphorus, citric acid, and mixtures thereof.

9. The method of claim 3 wherein the pH is in the range of about 3.0 to about 6.0.

10. The method of claim 3 wherein the quaternary amine is mixed with and acid by weight in percentage up to about 30% of the mixture.

11. The method of claim 3 including a corrosion inhibitor in an effective amount added to the quaternary amine and acid mixture.

* * * * *